United States Patent [19]

Higaki

[11] Patent Number: 4,934,822
[45] Date of Patent: Jun. 19, 1990

[54] PWM-CONTROLLED POWER SUPPLY CAPABLE OF ELIMINATING MODULATION-FREQUENCY SIGNAL COMPONENTS FROM GROUND POTENTIALS

[75] Inventor: Shigetoshi Higaki, Fuchu, Japan

[73] Assignee: Kabushiki Kaisha Toshiba, Kawasaki, Japan

[21] Appl. No.: 349,099

[22] Filed: May 9, 1989

[30] Foreign Application Priority Data

May 9, 1988 [JP] Japan .................. 63-110543

[51] Int. Cl.$^5$ .......................................... H02M 5/451
[52] U.S. Cl. ...................... 363/37; 363/41; 363/98
[58] Field of Search .............. 363/17, 37, 41, 9 B, 363/132

[56] References Cited

U.S. PATENT DOCUMENTS 3,710,222  1/1973  Jessee ...................... 363/41
3,958,171  5/1976  Sekino ..................... 363/41

OTHER PUBLICATIONS

Makino, et al., "New Power Supply System for Air Conditioner Using Bidirectional Current Controlled Converter", pp. 457–462, 9/1988.

Primary Examiner—Patrick R. Salce
Assistant Examiner—Jeffrey Sterrett
Attorney, Agent, or Firm—Foley & Lardner, Schwartz, Jeffery, Schwaab, Mack, Blumenthal & Evans

[57] ABSTRACT

In a PWM control type power supply apparatus, there are provided a single-phase full-wave rectifier coupled to a power source having a low frequency, for rectifying a first AC (alternating current) voltage to produce a DC (direct current) voltage; a DC-to-AC inverter including a first pair of switching elements connected to an input terminal thereof, and a second pair of switching elements connected to an output terminal thereof and to the first pair of switching elements to constitute a bridge inverter circuit, for inverting the DC voltage into a second AC voltage to be applied to a load; and a switching controller connected to the DC/AC inverter for alternately turning ON/OFF the second pair of switching elements in response to a sync signal (SYC) in synchronism with the first AC voltage at the low frequency of the power source, and for alternately turning ON/OFF the first pair of switching elements in response to a PWM (pulse-width modulation) control signal obtained from the first AC voltage and the second AC voltage, in a PWM control mode at a high-frequency higher than the low frequency of the power source, whereby a phase of the second AC voltage is opposite to that of the first AC voltage.

5 Claims, 5 Drawing Sheets

PWM-CONTROLLED POWER SUPPLY CAPABLE OF ELIMINATING MODULATION-FREQUENCY SIGNAL COMPONENTS FROM GROUND POTENTIALS

BACKGROUND OF THE INVENTION

1. Field of the Invention

The present invention generally relates to a constant voltage/constant frequency power supply apparatus under control of pulse-width modulation. More specifically, the present invention is directed to a PWM (pulse-width modulation)-control type uninterruptive power source (UPS) whose ground potential has no high-frequency (modulaton frequency) signal components.

2. Description of the Related Art

In FIG. 1, there is shown a major circuit of a typical constant voltage/constant frequency power supply apparatus known as an uninterruptive power source in the field.

A circuit arrangement of this power supply apparatus is as follows: A voltage of a single-phase AC power supply source 1, one line of which is grounded, is rectified in a full waveform rectifying mode by a bridge rectifier 2 constructed of diodes 21 to 24. The rectified voltage is converted into a predetermined DC voltage via a step-up chopper 7 constructed of a DC reactor 71, a switching element 72, and a diode 73, and a smoothing capacitor 3. Thereafter, the resultant DC voltage is again converted into a corresponding AC voltage by way of pulse-width-modulation (PWM) controlling operations by an inverter circuit 4 arranged by a bridge-construction of switching elements 41 to 44. The resultant AC voltage is filtered by an L-type filter 5 including a reactor 51 and a capacitor 52 so as to eliminate high-frequency signal components and converted into a smoothed sinusoidal wave. Finally, this sinusoidal wave voltage is applied to a load 6.

The function of the step-up chopper 7 is to increase the input voltage in order that the output AC voltage is equal to the power source voltage. Alternatively, the input AC voltage may be stepped up by, for instance, a transformer and thereafter may be rectified.

In fact, according to the above-described conventional power supply apparatus, the high-frequency signal components have been eliminated from the AC voltage applied to the load. However, the high-frequency signal components appear in the ground potentials due to an employment of the PWM control operations.

Referring now to waveforms shown in FIG. 2, a description will be made why the high-frequency signal components are contained in the ground potentials.

Assuming that a supply voltage (a voltage across L-N terminals) is equal to "$V_1$", a ground potential "$v_N$" at a ground side "N" of the power source 1 is equal to zero ("$v_N=0$"), whereas another ground potential "$v_L$" at a non-ground side "L" thereof is equal to "$V_1$" ($v_L=V_1$) (see FIG. 2A). A ground potential "$v_{DN}$" at a load side "DN" of a DC output from the rectifier 2 is determined by conducting the diodes 22 and 24. That is, during the positive period of the power source voltage $V_1$, the ground potential $v_{DN}$ is equal to zero ($v_{DN}=0$) since one diode 24 is turned ON. During the negative period of the power source voltage $V_1$, the ground potential $v_{DN}$ is equal to $V_1$ ($v_{DN}=V_1$). As a result, if the DC voltage is "$E_o$", another potential voltage $v_{DP}$ at the positive side "DP" is determined by:

$$v_{DP}=v_{DN}+E_o,$$

where $E_o$ is nearly equal to a constant (see FIG. 2B).

A ground potential "$v_V$" at an AC output "V" phase of the inverter circuit 4 is determined by turning ON/OFF the switching elements 43 and 44. When one switching element 43 is turned ON, the ground potential $V_v$ is equal to $v_{DP}$ ($v_V=v_{DP}$), whereas when the other switching element 44 is turned ON, the ground potential $v_V$ is equal to $v_{DN}$ ($v_V=v_{DN}$). In general, all of these switching elements are turned ON/OFF at a high speed (e.g., 10 to 20 KHz) under PWM control so that the ground potential of the V phase "$v_V$" contains the high-frequency signal (noise) components as "$v_{DP}$" and "$v_{DN}$" being envelope lines because of the PWM control operation (see FIG. 2C).

Another ground potential "$v_U$" at U phase of the AC output is determined by the following equation, if the AC output voltage is equal to "$V_o$":

$$v_U=v_V+V_o.$$

As a consequence, in case that the AC output voltage $V_o$ is equal to the power source voltage $V_1$ and also has a in-phase condition thereto, the ground potential "$v_U$" is represented by a waveform shown in FIG. 2D. This ground potential "$v_U$" contains the high-frequency signal components similar to the above-described ground potential "$v_V$". A maximum value "$v_U(max)$" of this ground potential "$v_U$" is defined by:

$$v_U(max)=\text{a peak value of } V_o+E_o.$$

It is obvious that this maximum value "$v_U(max)$" is considerably higher than the AC output voltage $V_o$ from the inverter 4.

In case that the AC output voltage $V_o$ is equal to the power source voltage $V_1$ and also has a reverse-phase condition thereto, the ground potential "$v_U$" is represented by a waveform shown in FIG. 2E. This ground potential "$v_V$" also contains the high-frequency signal components.

As described above, according to the conventional PWM controlled power supply apparatus, since the variations in the ground potentials at the output terminal thereof contain the high-frequency signal (noise) components produced by the high speed switching operation of the DC/AC inverter, it is necessary to employ a large-scale line filter so as to filter out such high-frequency noise components. In particular, as a power, supply apparatus used for computers, the high-frequency noises must be completely eliminated. Also, if a surge suppressor capable of absorbing indirect lightning or switching surges is provided between the line and ground, this surge suppressor may be burned out. Specifically, since the very high voltage is instantaneously applied, the rated voltage of the surge suppressor must be selected to be a proper high value.

SUMMARY OF THE INVENTION

The present invention has been made in an attempt to solve the above-described drawbacks of the conventional PWM-controlled power supply apparatus, and therefore has an object to provide a PWM-controlled power supply apparatus containing no high-frequency signal component produced by the pulse-width modulation switching operation in the ground potentials at the output terminal thereof, and having a suppressed maximum voltage.

A power supply apparatus according to the invention, comprises:

single-phase full-wave rectifier means (7) coupled to a power source (1) having a low frequency, for rectifying a first AC (alternating current) voltage ($V_1$) to produce a DC (direct current) voltage ($E_o$);

DC-to-AC inverter means (4) including a first pair of switching elements (41:42) connected to an input terminal thereof, and a second pair of switching elements (43:44) connected to an output terminal thereof and to the first pair of switching elements (41:42) to consititute a bridge inverter circuit, for inverting the DC voltage ($E_o$) into a second AC voltage ($V_o$) to be applied to a load (6); and, switching control means (80) connected to the DC/AC inverter means (4) for alternately turning ON/OFF the second pair of switching elements (43:44) in response to a sync signal (SYC) in synchronism with the first AC voltage ($V_o$) at the low frequency of the power source (1), and for alternately turning ON/OFF the first pair of switching elements (41:42) in response to a PWM (pulse-width modulation) control signal obtained from the first AC voltage ($V_1$) and the second AC voltage ($V_o$), in a PWM control mode at a modulation frequency higher than the low frequency of the power source (1), whereby a phase of the second AC voltage ($V_o$) is opposite to that of the first AC voltage ($V_1$).

BRIEF DESCRIPTION OF THE DRAWINGS

For a better understanding of the present invention, reference is made to the following descriptions in conjunction with the accompanying drawings, in which.

DETAILED DESCRIPTION OF THE PREFERRED EMBODIMENTS

RECOGNITIONS

The power supply apparatus according to the present invention has been accomplished based upon the following recognitions.

A major function of the power supply apparatus according to the invention is to supply high power, e.g., 1 to 2 KVA, from which the high-frequency signal components (noises) have been eliminated, to an electronic appliance such as a computer. Thus, the DC-to-AC inverter employed in the power supply apparatus is operated in a high-speed switching mode, for instance, 10 to 20 $KH_Z$. Accordingly, this DC/AC inverter needs to employ switching elements capable of being operated at the higher frequencies (10 to 20 $KH_Z$), higher voltages (on the order of 400V) and large currents (on the order of 60A). As such switching elements operable under severe conditions, a power FET (field-effect transistor), IGBT (insulated gate bipolar transistor), and a power NPN transistor may be employed.

Although not shown in figures, a battery is connected to an output side of a rectifier connected to the power source so as to function as an uninterruptive power supply apparatus (referred to as an "UPS").

As previously described, the filter connected to the output side of the DC/AC inverter can hardly remove the high-frequency switching noises (high-frequency signal components) contained in the ground potentials between the output line of the power supply apparatus and the ground line. Therefore, according to the present invention, a pair of switching elements coupled to the output side of this inverter are switched at a lower frequency, e.g., a frequency of a power source, say 50 to 60 $H_Z$, whereas another pair of switching elements coupled to the input side of this inverter are switched in the PWM mode in the higher frequency (i.e. modulation frequency), e.g., 10 to 20 $KH_Z$. As a result, such high-frequency switching noises can be eliminated from the ground potentials. In other words, the present invention has been made to remove the high-frequency (modulation frequency) switching noises from the ground potentials, taking account of such noises contained in the ground potentials.

In contrast thereto, in the conventional power supply apparatus, all of four switching elements constituting the DC/AC inverter are switched at the high-frequency frequency, e.g., 10 to 20 $KH_Z$.

ARRANGEMENT OF POWER SUPPLY APPARATUS

Reffering now to FIG. 3, an arrangement of a PWM (pulse-width modulation) type power supply apparatus 100 according to a first preferred embodiment of the invention will be described.

Figure 1:
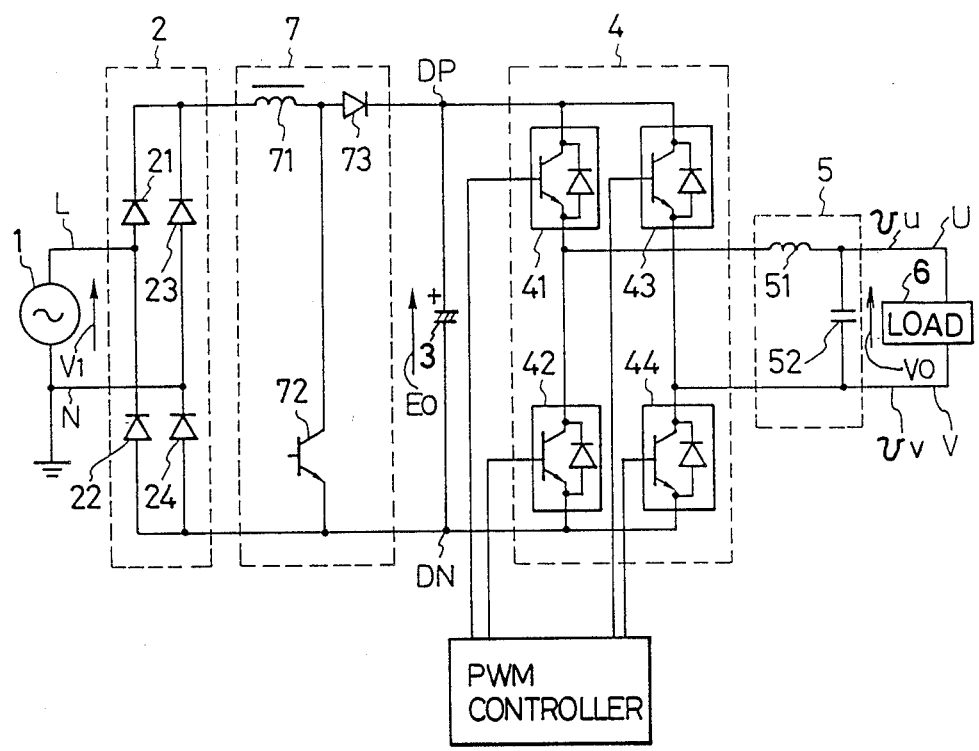
FIG. 1 is a schematic block diagram of the conventional PWM-controlled power supply apparatus.
Figure 2:
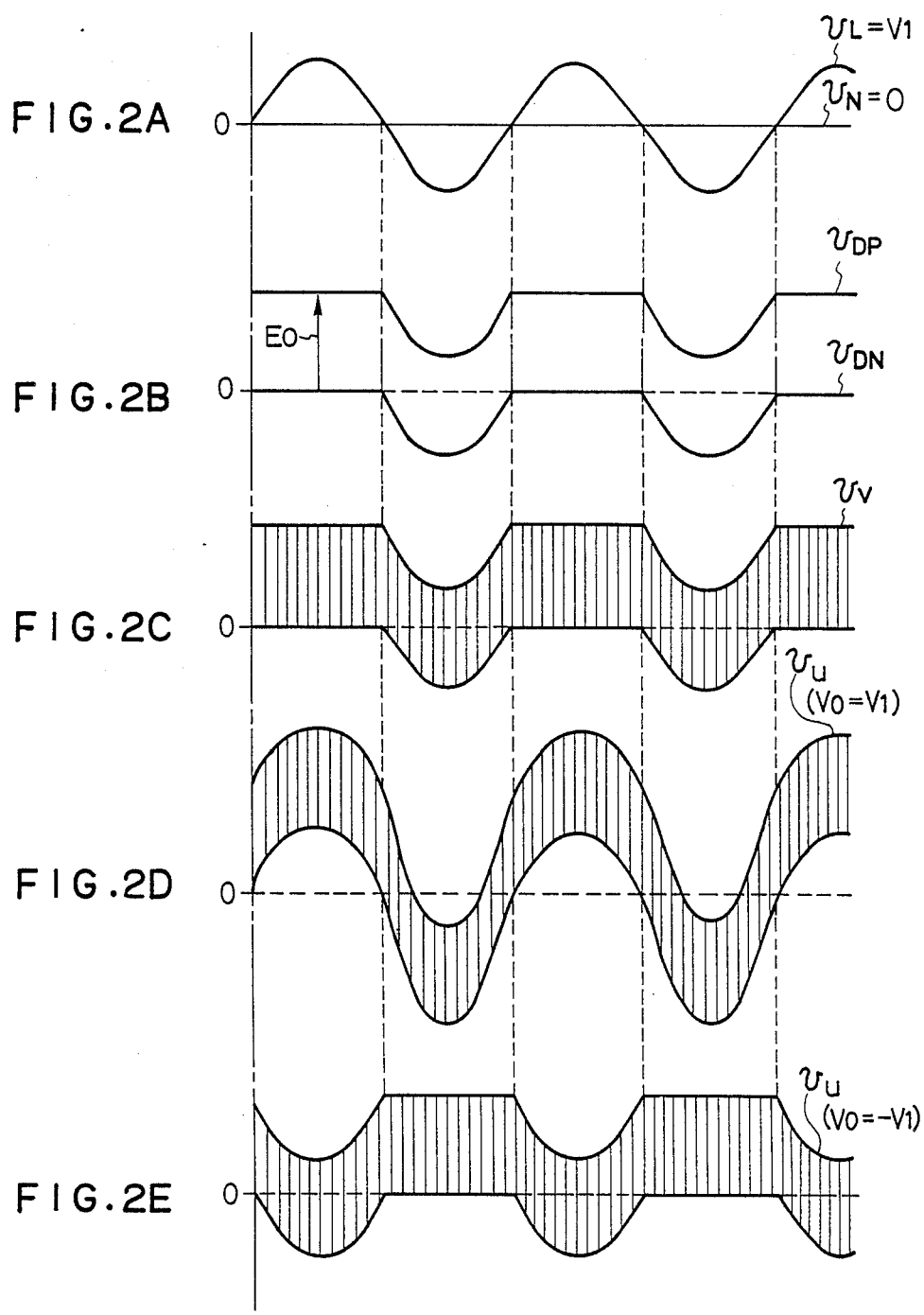
FIGS. 2A to 2E are waveform charts for illustrating high-frequency signal components contained in the ground potentials of the power supply apparatus shown in FIG. 1.

It should be noted that since the major circuit arrangement of this power supply apparatus 100 is the same as that of the conventional power supply apparatus shown in FIG. 1, no further explanations thereof is made in the following specification. Therefore, only a featured circuit arrangement of this power supply apparatus 100 will now be described in detail. That is, a pulse-width modulation(PWM) control unit 80 will now be described in detail. The major function of this PWM control unit 80 is as follows. Both the power source voltage "$V_1$" and the filtered AC output voltage "$V_0$" are input into the PWM control unit 80 and then a first switching signal is produced so as to supply a first pair of switching elements 41 and 42 employed in the DC/AC inverter 4. As a result, there switching elements 41 and 42 connected to the input side (terminals) of the DC/AC inverter 4 are alternately turned ON/OFF in a PWM mode at a higher frequency, e.g., 10 to 20 $KH_Z$. Simultaneously, a second switching signal is produced in the PWM control unit 80 in order to alternately turn ON/OFF a second pair of switching elements 43 and 44 connected to an output side (terminals) of the DC/AC inverter 4 at a lower frequency, e.g., 50 to 60 $H_Z$.

The PWM control unit 80 includes a sync generator circuit 81 for producing a sync signal "SYC" in synchronization with the power source voltage "$V_1$", and a voltage reference signal "$V_{REF}$"; a switching element control circuit 82 for switching the second pair of switching elements 43 and 44 in response to the sync signal "SYC"; and a PWM controller 83 for controlling the switching operations of the first pair of switching elements 41 and 42 in the PWM (pulse-width modulation) mode by comparing the voltage reference signal $V_{REF}$ with the AC output voltage $V_0$.

OPERATIONS

Figure 4:
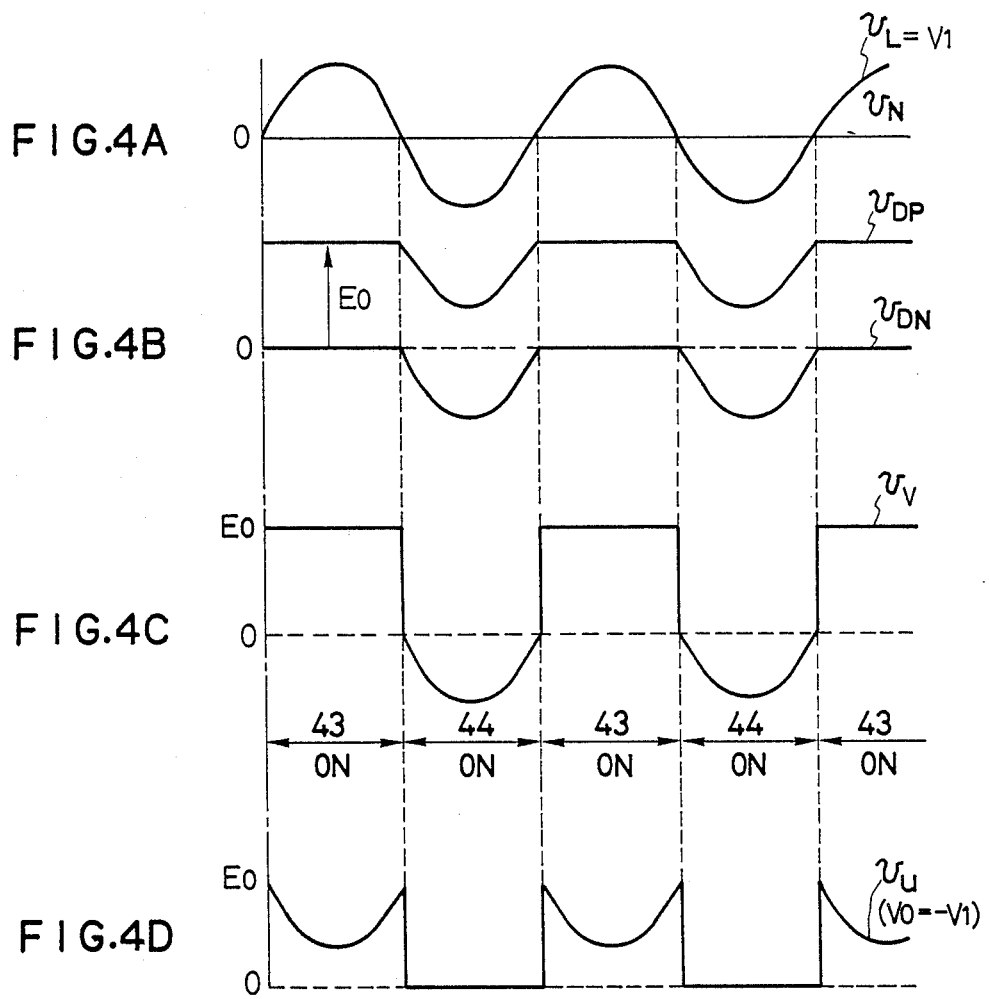
FIGS. 4A to 4D are waveform charts for illustrating various ground potentials of the power supply apparatus shown in FIG. 3, from which the high-frequency signal components have been eliminated; and, FIG. 5 is a schematic block diagram of an internal circuit of the PWM controller employed in the power supply apparatus shown in FIG. 3.

Various operations of the power supply apparatus 100 will now be described with reference to waveform charts shown in FIGS. 4A to 4D. As shown in FIG. 4A, both the ground potentials "$v_L$" and "$v_N$" of the power source 1, and the ground potentials "$v_{DP}$" and "$v_{DN}$" of the DC circuit have the same voltage waveforms as those of the conventional power supply apparatus. As previously described, the sync signal generator 81 produces the sync signal "SYC" having a phase in synchronism with that of the power source voltage "$V_1$" (will be discussed later), whereby the switching element control circuit 82 alternately turns ON/OFF the second pair of switching elements 43 and 44, i.e., every 180°. In the preferred embodiment, while the polarity of the power source voltage "$V_1$" represents a positive half cycle, one switching element 43 is turned ON, whereas while it represents a negative half cycle, the other switching element 44 is turned ON. These switching elements 43 and 44 are alternately turned ON/OFF at the higher frequency, e.g., 10 to 20 KHz.

As a consequence, the ground potential "$v_V$" at the V phase of the DC/AC inverter circuit 4 is equal to "$E_0$" during the positive half cycle of the power source voltage "$V_1$", and is equal to "$V_1$" during the negative half cycle thereof, as illustrated in FIG. 4B.

Similarly, as previously described, the PWM controller 83 compares the AC output voltage $V_0$ from the DC/AC inverter 4 with the voltage reference signal "$V_{REF}$" proportional to the power source voltage "$V_1$" and PWM-controls the switching elements 41 and 42 in such a manner that the phase of the AC output voltage $V_0$ is opposite to that of the power source voltage $V_1$. As a consequence, the AC output voltage "$V_0$" applied from the inverter 4 via the filter 5 has a reverse phase with respect to the phase of the power source voltage $V_1$ as illustrated in FIG. 4C. Then, the ground potential "$v_U$" at the U phase of the AC output side (DC/AC inverter 4) is nearly equal to ($E_0-V_1$) during the positive half cycle of the power source voltage "$V_1$", whereas it becomes nearly zero during the negative half cycle thereof.

As clearly described above, the ground potentials at the AC output terminals of the DC/AC inverter 4 contains no high-frequency signal (noise) component at all which is caused by the PWM control by the DC/AC inverter 4, and the maximum values of these ground potentials are lower than, or equal to $E_0$ (DC input voltage for this inverter 4).

While has been described in detail, according to the power supply apparatus 100 of the preferred embodiment, a pair of switching elements 43 and 44 of the DC/AC inverter 4 are alternately turned ON/OFF in synchronism with the AC power source voltage $V_1$, namely at the lower frequency. Another pair of switching elements 41 and 42 are alternately turned ON/OFF in the PWM mode at the higher frequency. As a result, the AC output voltage $V_0$ having the phase opposite (reverse) to that of the AC power source voltage $V_1$ are derived from the AC/DC inverter 4. Thus, the AC output voltage $V_0$ of the inverter 4 is voltage-controlled by way of the PWM mode, and also the ground potentials with respect to this AC output voltage $V_0$ contain no high-frequency signal component produced by this PWM controlling operation. Moreover, the peak voltage of the ground potential may be suppressed by cancelling a phase difference between the input voltage and output voltage.

DETAILED CIRCUIT OF INVERTER CONTROLLER

An internal circuit of the PWM control unit 80 will now be described with reference to FIG. 5.

Figure 3:
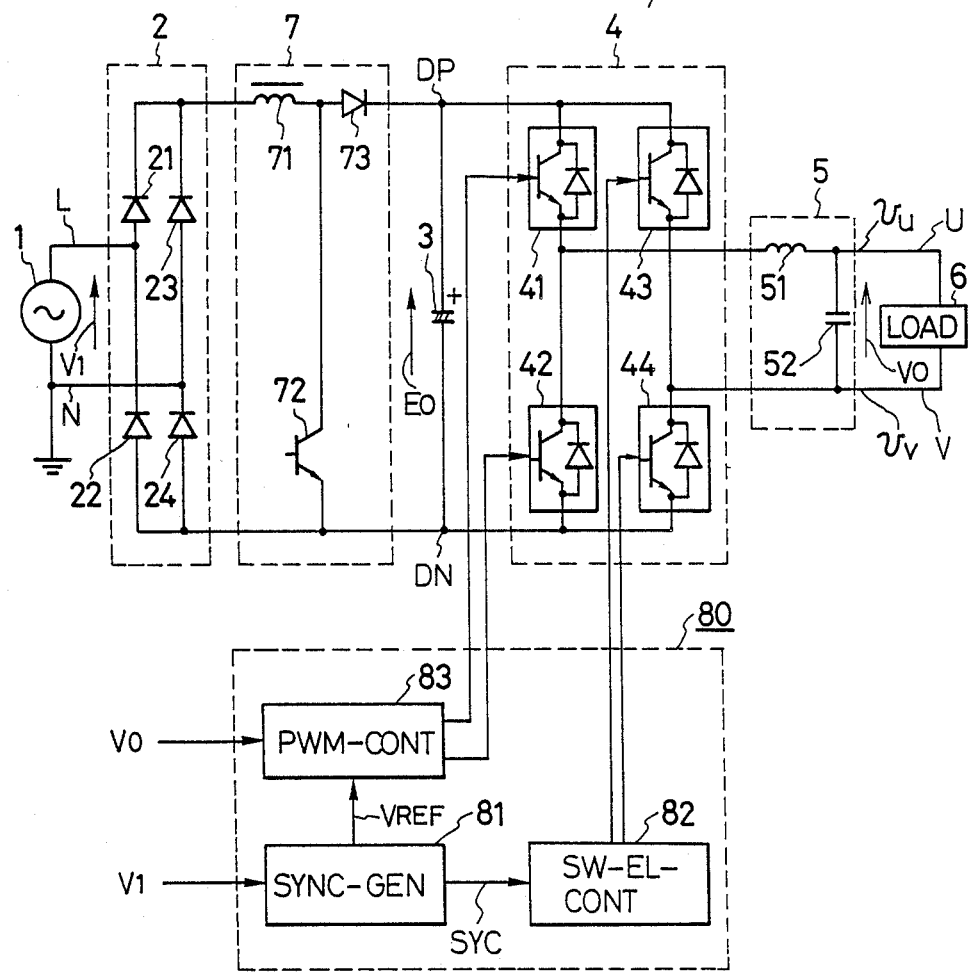
FIG. 3 is a schematic block diagram of a PWM-controlled power supply apparatus according to a preferred embodiment of the invention.
Figure 5:
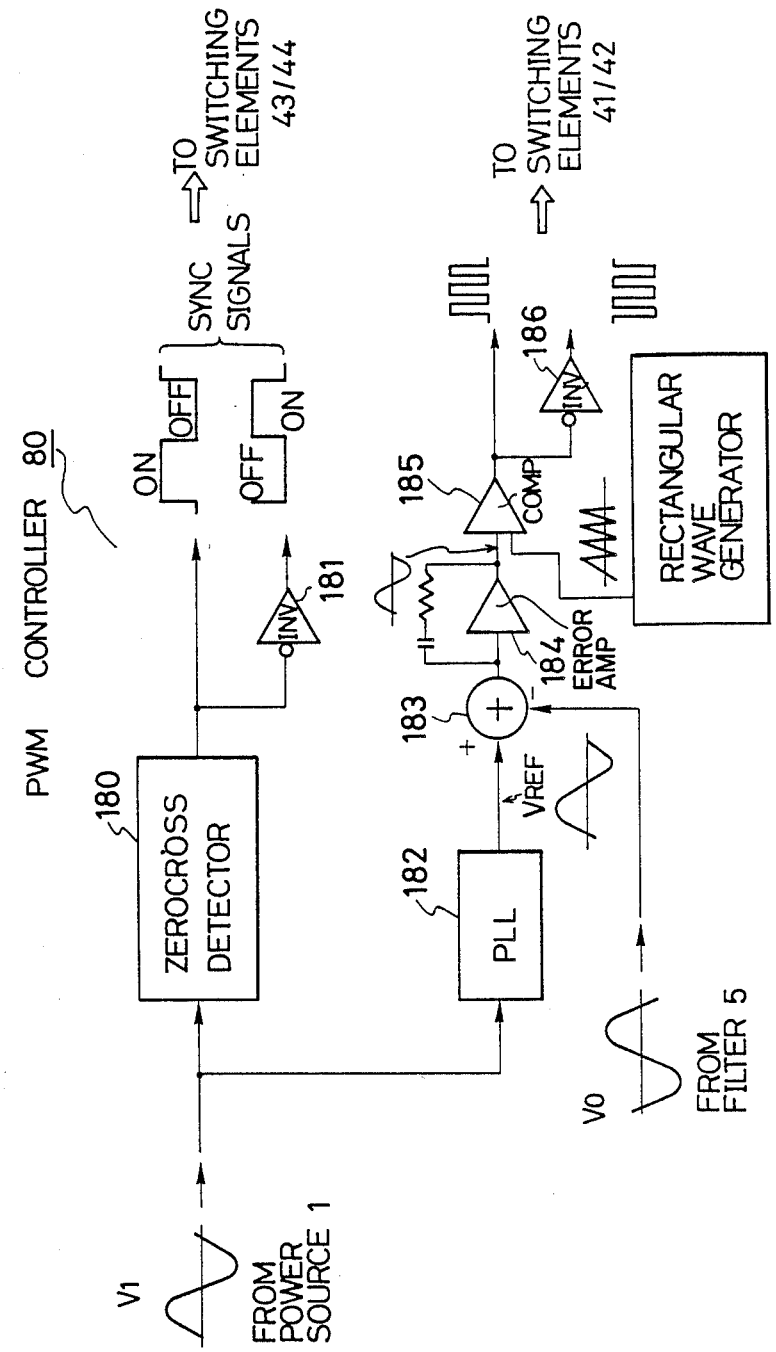

In a circuit diagram of FIG. 5, a zerocross detector 180 is employed to receive a sinusoidal voltage $V_1$ applied from the power source 1 shown in FIG. 3. Then, the zerocross detector 180 produces rectangular waves (signals) at the respective zerocross points of the input voltage "$V_1$". The rectangular waves are inverted by an inverter 181. As a result, these rectangular signals having a 180°-phase difference with each other are supplied as the sync signals to the second pair of switching elements 43 and 44 connected to the output side of the inverter 4. In response to these sync signals, the switching elements 43 and 44 are alternately turned ON/OFF in a 180° phase difference at the lower frequency, e.g., 50 to 60 Hz.

Also, the input voltage $V_1$ is applied to a PLL (phase-locked loop) circuit 182 so as to produce the reference voltage "$V_{REF}$". This reference voltage "$V_{REF}$" is added to the AC output voltage "$V_0$" from the filter 5 in an adder 183. Then, the added output is amplified in an error amplifier 184. Thereafter, an output from this error amplifier 184 is supplied to one input terminal of a comparator 185, and also a sawtooth signal derived from a rectangular wave generator (not shown) is input into the other input terminal thereof.

The comparator 185 compares these two input signals and then outputs an high-frequency rectangular signal having a frequency of, for instance, 10 to 20 KHz. Similarly this high-frequency rectangular signal is inverted by an inverter 186, whereby the high-frequency rectangular signals having a 180° phase shift with each other are produced. These high-frequency rectangular signals are supplied to the first pair of switching elements 41 and 42 coupled to the input side of the inverter 4 in order to alternately turn ON/OFF these switching elements 41 and 42 in the PMW mode.

As described above, in the power supply apparatus according to the invention, the ground potentials of the AC output voltage thereof contain no longer the high-frequency switching noise components which are produced by the PWM controlling operation and are harmful to the electronic appliances such as computers. In addition, the size of the noise filter coupled to the output terminal of the DC/AC inverter may be made small, otherwise omitted. Since the high-frequency signal components produced by the PWM controlling operation give no adverse effect to the load, the DC/AC inverter may be operated at more higher switching frequencies. Moreover, according to the invention, since the ground potentials may be set to low, it is possible to provide a safety and highly reliable PWM controlled power supply apparatus.

What is claimed is:

1. A power supply apparatus comprising:

single-phase full-wave rectifier means coupled to a power source having a low frequency, for rectifying a first AC (alternating current) voltage to produce a DC (direct current) voltage;

DC-to-AC inverter means including a first pair of switching elements connected to an input terminal thereof, and a second pair of switching elements connected to an output terminal thereof and to the first pair of switching elements to constitute a bridge inverter circuit, for inverting the DC voltage into a second AC voltage to be applied to a load; and, switching control means connected to the DC/AC inverter means for alternately turning ON/OFF the second pair of switching elements in response to a sync signal (SYC) in synchronism with the first AC voltage at the low frequency of the power source, and for alternately turning ON/OFF the first pair of switching elements in response to a PWM (pulse-width modulation) control signal obtained from the first AC voltage and the second AC voltage, in a PWM control mode at a modulation frequency higher than the low frequency of the power source, whereby a phase of the second AC voltage is opposite to that of the first AC voltage.

2. A power supply apparatus as claimed in claim 1, further comprising a smoothing capacitor interposed between the rectifier means and DC/AC inverter means, for smoothing the DC voltage $E_o$ derived from the rectifier means.

3. A power supply apparatus as claimed in claim 1, further comprising an L type filter constructed of an inductor and a capacitor, interposed between the DC/AC inverter and load.

4. A power supply apparatus as claimed in claim 1, wherein said switching control means includes:
 a zerocross detector for receiving the first AC voltage of the power source to detect zerocross points thereof, thereby producing said sync signal in synchronism with the zerocross points;
 a PLL (phase-locked loop) circuit for receiving the first AC voltage to derive a reference voltage; and,
 a PWM control signal generator for generating said PWM control signal from said reference voltage and said second AC voltage.

5. A power supply apparatus as claimed in claim 4, wherein said PWM control signal generator includes an adder an error amplifier and a comparator.

* * * * *